US 9,514,111 B1

United States Patent
Cornea et al.

(10) Patent No.: US 9,514,111 B1
(45) Date of Patent: *Dec. 6, 2016

(54) PROVIDING AUTOCOMPLETE SUGGESTIONS

(71) Applicant: Google Inc., Mountain View, CA (US)

(72) Inventors: Radu C. Cornea, Sunnyvale, CA (US); Nicholas B. Weininger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 14/164,374

(22) Filed: Jan. 27, 2014

Related U.S. Application Data

(63) Continuation of application No. 13/222,783, filed on Aug. 31, 2011, now Pat. No. 8,645,825.

(51) Int. Cl.
*G06F 17/00* (2006.01)
*G06F 17/24* (2006.01)
*G06F 17/27* (2006.01)

(52) U.S. Cl.
CPC ............. *G06F 17/24* (2013.01); *G06F 17/273* (2013.01)

(58) Field of Classification Search
CPC .................................................. G06F 17/273
USPC ....................................................... 715/257
See application file for complete search history.

(56) References Cited

U.S. PATENT DOCUMENTS

| | | |
|---|---|---|
| 6,006,225 A | 12/1999 | Bowman |
| 6,208,339 B1 | 3/2001 | Atlas |
| 6,370,518 B1 | 4/2002 | Payne |
| 6,377,965 B1 | 4/2002 | Hachamovitch |
| 6,411,950 B1 | 6/2002 | Moricz |
| 6,751,606 B1 | 6/2004 | Fries |
| 7,103,470 B2 | 9/2006 | Mintz |
| 7,149,970 B1 | 12/2006 | Pratley |
| 7,483,880 B2 | 1/2009 | Rossi |
| 7,487,145 B1 | 2/2009 | Gibbs |
| 7,487,185 B2 | 2/2009 | Lomelin-Stoupignan |
| 7,499,940 B1 | 3/2009 | Gibbs |

(Continued)

FOREIGN PATENT DOCUMENTS

| | | |
|---|---|---|
| EP | 1565845 B1 | 8/2008 |

OTHER PUBLICATIONS

Chen et al., Side-Channel Leaks in Web Applications: a Reality Today, a Challenge Tomorrow, IEEE 2010, pp. 191-206.*

(Continued)

*Primary Examiner* — Cong-Lac Huynh
(74) *Attorney, Agent, or Firm* — Fish & Richardson P.C.

(57) ABSTRACT

Methods, systems, and apparatus, including computer programs encoded on a computer storage medium, for providing autocomplete suggestions. A computing device can receive an n-gram of characters. Cached autocomplete suggestions can be identified in a local cache of the computing device. Additional autocomplete suggestions can be requested at a first time. The computing device can prevent presentation of the cached autocomplete suggestions until a presentation event occurs. The presentation event can include (i) receiving the requested additional autocomplete suggestions by the computing device or (ii) the end of a predetermined period after the first time. The computing device can determine that that the presentation event has occurred, and in response, can display one or more autocomplete suggestions.

20 Claims, 3 Drawing Sheets

(56) References Cited

U.S. PATENT DOCUMENTS

| | | | |
|---|---|---|---|
| 7,634,463 B1 | 12/2009 | Katragadda | |
| 7,672,932 B2 | 3/2010 | Hood | |
| 7,685,144 B1 | 3/2010 | Katragadda | |
| 7,725,485 B1 | 5/2010 | Sahami | |
| 7,752,326 B2 | 7/2010 | Smit | |
| 7,788,248 B2 | 8/2010 | Forstall | |
| 7,836,044 B2 | 11/2010 | Kamvar | |
| 7,890,961 B2* | 2/2011 | Whittle | G06F 17/30286 709/203 |
| 7,941,762 B1 | 5/2011 | Tovino | |
| 8,060,639 B2 | 11/2011 | Smit | |
| 8,112,529 B2 | 2/2012 | van | |
| 8,156,109 B2 | 4/2012 | Kamvar | |
| 8,234,293 B2 | 7/2012 | Martynov | |
| 8,601,019 B1* | 12/2013 | Weininger | G06F 17/3097 707/769 |
| 8,620,084 B2* | 12/2013 | Kolmykov-Zotov | G06K 9/00409 382/156 |
| 8,762,858 B1* | 6/2014 | Tovino | H04L 51/046 715/708 |
| 8,850,310 B2* | 9/2014 | Rampson | G06F 3/0237 715/234 |
| 8,868,592 B1* | 10/2014 | Weininger | G06F 17/3064 707/767 |
| 8,918,836 B2* | 12/2014 | Schechter | G06F 21/46 713/183 |
| 9,128,921 B2* | 9/2015 | Griffin | G06F 17/273 |
| 9,218,525 B2* | 12/2015 | Kolmykov-Zotov | G06K 9/00409 |
| 2010/0318538 A1 | 12/2010 | Wyman | |
| 2011/0106966 A1 | 5/2011 | Smit | |
| 2011/0201387 A1 | 8/2011 | Paek | |
| 2011/0202848 A1 | 8/2011 | Ismalon | |
| 2011/0202876 A1 | 8/2011 | Badger | |
| 2011/0288863 A1 | 11/2011 | Rasmussen | |
| 2012/0016678 A1 | 1/2012 | Gruber | |
| 2012/0023120 A1 | 1/2012 | Kanefsky | |
| 2012/0047135 A1 | 2/2012 | Hansson | |
| 2012/0166929 A1* | 6/2012 | Henderson | G06F 17/2785 715/224 |
| 2012/0167009 A1 | 6/2012 | Davidson | |
| 2012/0245944 A1 | 9/2012 | Gruber | |
| 2012/0260188 A1 | 10/2012 | Park | |
| 2012/0278308 A1 | 11/2012 | Zhou | |
| 2012/0290712 A1 | 11/2012 | Walter | |
| 2013/0110519 A1 | 5/2013 | Cheyer | |
| 2013/0185074 A1 | 7/2013 | Gruber | |
| 2014/0298208 A1* | 10/2014 | Tovino | H04L 51/046 715/753 |
| 2014/0365874 A1* | 12/2014 | Rampson | G06F 3/0237 715/243 |

OTHER PUBLICATIONS

Fafalios et al., Scalable, Flexible and Generic Instant Overview Search, ACM 2012, pp. 333-336.*
"The Real Live Search" http://www.istartedsomething.com/livesearch. [online] [retrieved on Aug. 5, 2011] 1 page.
'Closure Library (Labs).' Event Handling—Closure Library—Google Code [online]. 2011 [retrieved on Aug. 16, 2011]. Retrieved from the Internet electronic mail: http://code.google.com/closure/library/docs/events_tutorial.html, 4 pages.
'Closure Library (Labs).' Finding Your Way around the Closure Library—Closure Library—Google Code [online]. 2011 [retrieved on Aug. 16, 2011]. Retrieved from the Internet electronic mail: http://code.google.com/closure/library/docs/introduction.html, 3 pages.
'Closure Templates (Labs).' Closure Templates—Google Code [online]. 2011 [retrieved on Aug. 16, 2011]. Retrieved from the Internet electronic mail http://code.google.com/closure/templates, 2 pages.
'Closure-Library.' closure-library—Closure Library—Google Project Hosting [online]. 2011 [retrieved on Aug. 16, 2011]. Retrieved from the Internet electronic mail: http://code.google.com/p/closure-library/, 1 page.
'JSONP' JSONP—Wikpedia, the free encyclopedia [online]. [retrieved on Aug. 16, 2011]. Retrieved from the Internet electronic mail: http://en.wikipedia.org/wiki/JSONP, 4 pages.
'The official Google Code blog.' Introducing Closure Tools—The official Google Code blog [online]. Nov. 5, 2011 [retrieved on Aug. 16, 2011]. Retrieved from the Internet electronic mail: http://googlecode.blogspot.com/2009/11/introducing-closure-tools.html, 10 pages.
'XMLHttpRequest.' XMLHttpRequest—Wikipedia, the free encyclopedia [online]. last modified on Aug. 11, 2011 [retrieved on Aug. 16, 2011]. Retrieved from the Internet electronic mail: http://en.wikipedia.org/wiki/XHR, 8 pages.
Amin et al., List, Group or Menu: Organizing Suggestions in Autocompletion Interfaces, Google 2009, pp. 1-14.
Chennavasin, Don "A look inside the world of search from the people of Yahoo!" http://www.ysearchblog.com/archives/000301.html. Yahoo! Search blog: Livesearch on AlltheWeb, May 9, 2006, 5 pages.
Hildebrand et al. Configuring Semantic Web Interfaces by Data Mapping, Google 2009, pp. 1-9.
Matani, An O (k log n) Algorithm for Prefix based Ranked Autocomplete, Google 2011, pp. 1-14.
McGee, Matt "Yahoo Had Instant Search in 2005 & Dropped It; Bing Kind of Has It Now," http://www.searchengineland.com. Sep. 9, 2010, 12 pages.
Notice of Allowance issued in U.S. Appl. No. 13/213,904 on Apr. 3, 2013, 15 pages.
Notice of Allowance issued in U.S. Appl. No. 13/213,904 on Dec. 26, 2012, 14 pages.
Notice of Allowance issued in U.S. Appl. No. 13/216,880 on Dec. 24, 2912, 14 pages.
Notice of Allowance issued in U.S. Appl. No. 13/216,880 on Jul. 17, 2013, 12 pages.
Notice of Allowance issued in U.S. Appl. No. 13/216,880 on Mar. 26, 2013, 13 pages.
Notification of Transmittal of the International Search Report and the Written Opinion of the International Searching Authority, or the Declaration for PCT/US2011/048407 dated Dec. 8, 2011, 13 pages.
Notification of Transmittal of the International Search Report and the Written Opinion of the International Searching Authority, or the Declaration for PCT/US2011/048419 dated Dec. 8, 2011, 18 pages.
Office Action issued in U.S. Appl. No. 13/184,267 on Aug. 30, 2012, 18 pages.
Office Action issued in U.S. Appl. No. 13/184,267 on Jan. 9, 2013, 20 pages.
Office Action issued in U.S. Appl. No. 13/184,267 on Sep. 12, 2013, 20 pages.
Office Action issued in U.S. Appl. No. 13/213,880 on Aug. 21, 2012, 20 pages.
Office Action issued in U.S. Appl. No. 13/213,904 on Sep. 13, 2012, 26 pages.
Pennell et al., "Implementing a Real-time Suggestion Service in a Library Discover Layer," Google 2010, pp. 1-14.
YouTube.com "Livesearch: Predictive Search Engine from Yahoo (2006)" http://www.youtube.com/watch?v=_EaSocSYSB8. [online] [retrieved Aug. 19, 2011].
Office Action cited in U.S. Appl. No. 13/222,783 on Feb. 11, 2013, 15 pages.
Notice of Allowance issued in U.S. Appl. No. 13/222,783 on Jun. 17, 2013, 8 pages.
Notice of Allowance issued in U.S. Appl. No. 13/222,783 on Oct. 2, 2013, 17 pages.

* cited by examiner

PROVIDING AUTOCOMPLETE SUGGESTIONS

CROSS-REFERENCE TO RELATED APPLICATIONS

This application is a continuation of U.S. patent application Ser. No. 13/222,783, filed on Aug. 31, 2011, the contents of which are incorporated herein by reference in their entirety.

BACKGROUND

This document relates to data processing and providing autocomplete suggestions.

Entering user input using computing devices is a common activity, and text is a common form of user input. Entering text and other input to computing devices can be time consuming. In addition, erroneous keystrokes on a physical or virtual keyboard may require input to be corrected, further complicating the entry of input.

SUMMARY

A computing device can receive input and can identify autocomplete suggestions for the input using data stored in a cache. The computing device can also request additional autocomplete suggestions over a network, for example, from a server system or other remote system. The computing device can delay providing the autocomplete suggestions identified in the cache until a presentation event occurs. The presentation event can be, for example, receiving the requested additional autocomplete suggestions or the end of a predetermined period. In some implementations, the presentation event can be the earlier of (i) receiving the requested additional autocomplete suggestions and (ii) the end of a predetermined period.

One innovative aspect of the subject matter described in this specification is embodied in methods that include the actions of: receiving, by a computing device, an n-gram of characters; identifying, in a local cache of the computing device, cached autocomplete suggestions for the n-gram; requesting, at a first time and over a network, additional autocomplete suggestions for the n-gram; preventing, by the computing device, presentation of the cached autocomplete suggestions until a presentation event occurs, where the presentation event includes (i) receiving the requested additional autocomplete suggestions by the computing device or (ii) the end of a predetermined period after the first time; determining that the presentation event has occurred; and in response to determining that the presentation event has occurred, presenting one or more autocomplete suggestions.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, determining that the presentation event has occurred includes determining that the predetermined period after the first time, and presenting the one or more autocomplete suggestions includes presenting one or more of the cached autocomplete suggestions. Determining that the presentation event has occurred includes determining that the requested additional autocomplete suggestions have been received by the computing device, and presenting the one or more autocomplete suggestions includes presenting one or more of the received additional autocomplete suggestions. Presenting the one or more autocomplete suggestions includes presenting one or more of the cached autocomplete suggestions.

Preventing presentation of the cached autocomplete suggestions until the presentation event occurs includes preventing presentation of the cached autocomplete suggestions until the earlier of (i) receiving the requested additional autocomplete suggestions by the computing device and (ii) the end of the predetermined period after the first time. Calculating the predetermined period based on a typing speed of a user of the computing device. Identifying a network connection type of the computing device, and calculating the predetermined period based on the network connection type. Receiving the additional autocomplete suggestions over the network after the predetermined period has elapsed, and updating a display to indicate the received additional autocomplete suggestions.

Updating the display to indicate the received additional autocomplete suggestions includes: determining that a second presentation event has occurred, the second presentation event corresponding to the end of a predetermined time period after presenting the cached autocomplete suggestions; and updating the display to indicate the received additional autocomplete suggestions in response to determining that the second presentation event has occurred. Updating the display to indicate the received additional autocomplete suggestions includes displaying the additional autocomplete suggestions and the cached autocomplete suggestions. Before updating the display to indicate the received autocomplete suggestions, indicating that the display will be altered.

Receiving the additional autocomplete suggestions; determining that the received additional autocomplete suggestions should be presented based on a number of additional autocomplete suggestions received or based on a quality score associated with one or more of the received autocomplete suggestions; and presenting the additional autocomplete suggestions in response to determining that the additional autocomplete suggestions should be presented. Receiving the additional autocomplete suggestions; determining that the received additional autocomplete suggestions should be presented based on a number of cached additional autocomplete suggestions identified in the local cache or based on a quality score associated with one or more of the cached autocomplete suggestions; and presenting the received additional autocomplete suggestions in response to determining that the received additional autocomplete suggestions should be presented.

Receiving the additional autocomplete suggestions; and updating the local cache of the computing device based on the received additional autocomplete suggestions. Receiving the additional autocomplete suggestions, the additional autocomplete suggestions that are received being selected based on a usage frequency of text that is input to any of a plurality of devices associated with a user account for a user of the computing device.

Advantageous implementations can include one or more of the following features. Autocomplete suggestions can be accessed from multiple sources. A computing device can manage the tradeoff between providing autocomplete suggestions quickly and increasing the quantity and quality of autocomplete suggestions. A consistent user experience can be provided by ensuring a maximum delay or a consistent delay before autocomplete suggestions are presented. A computing device can adjust a timeout interval for requests for autocomplete suggestions. The presentation of autocomplete suggestions can be managed effectively when autocomplete suggestions are requested over a network connection with a high latency or a highly variable latency, for example, a wireless network connection such as a wireless fidelity (WiFi), a 2G cellular, a 3G cellular, or a 4G cellular network connection.

The details of one or more embodiments are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
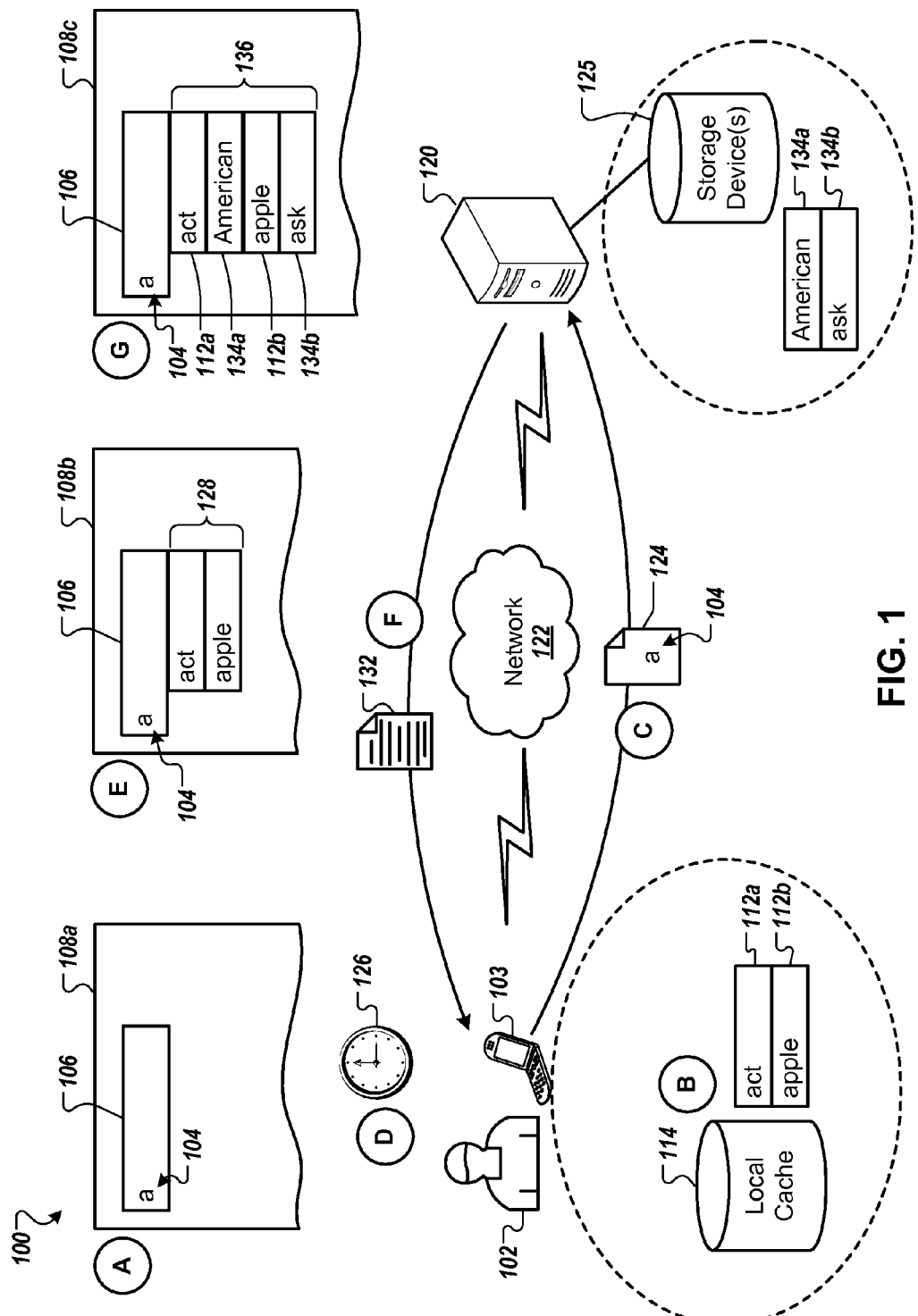
FIG. 1 is a diagram that illustrates an example environment in which autocomplete suggestions are provided.

FIG. 1 is a diagram that illustrates an example environment 100 in which autocomplete suggestions are provided. The environment 100 includes a computing device 103 and a server system 120 that communicate over a network 122. The diagram shows states (A) to (G), which may occur in the sequence illustrated or in a different sequence. States (B) to (D) and (F) illustrate a flow of data, and states (A), (E), and (G) illustrate user interfaces 108a, 108b, 108c.

The computing device 103 can be, for example, a desktop computer, a laptop computer, a cellular phone, a smartphone, a personal digital assistant (PDA), a tablet computer, a navigation system, or another computing device. The operations performed by the server system 120 can be performed by individual computer systems or can be distributed across multiple computer systems. The network 122 can be wired or wireless or a combination of both. The network 122 can include one or more public or private networks, and can include the Internet.

The computing device 103 facilitates entry of user input by providing suggested inputs to the user 102. For example, when a user 102 enters one or more characters, the computing device 103 can provide autocomplete suggestions that are selected using the entered one or more characters. The autocomplete suggestions that are provided can include words or phrases that include the one or more characters that were entered by the user 102. For example, complete words or complete phrases can be suggested for partial words or partial phrases that a user has entered. The autocomplete suggestions can also include words or phrases that are similar to (e.g., synonyms of or spelling corrections of) the user input. The user 102 can interact with (e.g., tap, click, or otherwise affirmatively select) one of the provided autocomplete suggestions to enter the suggested text.

In some implementations, the computing device 103 obtains autocomplete suggestions from two or more sources. For example, the computing device 103 can obtain autocomplete suggestions from a cache of (or another storage component for) the computing device. The computing device 103 can also obtain autocomplete suggestions from a remote system, such as the server system 120.

Upon receipt of the one or more characters, the computing device 103 can access the cache of the computing device to identify cached autocomplete suggestions for the one or more characters. For example, the computing device 103 can access the cached autocomplete suggestions and identify autocomplete suggestions that include the one or more characters input by the user 102. The computing device 103 can also request, in response to receipt of the one or more characters and over the network 122, additional autocomplete suggestions from the server system 120. For example, upon receiving the one or more characters, the computing device 103 can generate a request for additional autocomplete suggestions and transmit the request to the server system 120. The request can include the one or more characters with which the server system 120 will select the additional autocomplete suggestions.

In some implementations, the computing device 103 prevents the cached autocomplete suggestions from being displayed until, for example, additional autocomplete suggestions are received from the server system 120 or a predetermined wait period ends. If additional autocomplete suggestions are received from the remote before the end of the wait period at least some of the cached autocomplete suggestions and/or the additional autocomplete suggestions can be presented on the user device prior to the end of the wait period. If additional autocomplete suggestions are not received before the end of the wait period, the cached autocomplete suggestions can be presented at the end of the wait period.

For purposes of example, assume that in state (A), a user 102 enters an n-gram 104 of characters at the computing device 103. The n-gram 104 may include, for example, at least one character. The n-gram 104 may form one or more words or be a partial word.

In the illustrated example, an input field 106 (e.g., a text entry box) is included in the user interface 108a of the computing device 103. The user 102 enters the n-gram 104, a single letter "a", into the control 106. The user 102 can enter the n-gram 104 using, for example, a physical keyboard, a virtual keyboard displayed in the user interface 108a, or a different user interface.

The input field 106 can be, for example, a search query field or another entry field or editable area, such as any user interface element that is used for text input. The user interface 108a may be a user interface for a web browser, a rendered web page, a search application, an e-mail application, a text-messaging application (e.g., a short message service (SMS) application), or any other application that accepts input.

In some implementations, the n-gram 104 includes zero characters. As described further below, the computing device 103 may determine that autocomplete suggestions should be identified and presented based on detect interaction with the control 106 other than the entry of characters.

In state (B), in response to receiving the n-gram 104, the computing device 103 identifies autocomplete suggestions 112a, 112b for the n-gram 104 using data in a local cache 114. In the illustrated example, the autocomplete suggestions 112a, 112b include "act" and "apple", which each begin with the n-gram 104, "a".

The local cache 114 stores autocomplete data. Autocomplete data include data indicative of words and phrases that can be provided as autocomplete suggestions. The autocomplete data also include data indicative of a level of use for each of the words and phrases. For example, the autocomplete data can specify a use frequency or use count for (e.g., a measure of a frequency with which users interact with) each of the autocomplete suggestions.

The autocomplete data can optionally be personalized for the user 102. For example, personalized autocomplete data can specify words or phrases that have been recently input (e.g., input within a threshold period prior to the current time). The personalized autocomplete data can also specify words or phrases that are frequently entered (e.g., entered more than a threshold number of times) by the user 102 or at the computing device 103.

The personalized autocomplete data can be based on search queries entered by the user 102. When the control 106 is a search control, for example, the autocomplete suggestions can be identified from a set of previously entered queries of the user 102.

The autocomplete data can include use data based on general usage of the words or phrases (e.g., a rate with which many different users have interacted with the autocomplete suggestions). The autocomplete data may include the various words and phrases as text segments or in other forms. Autocomplete data may additionally or alternatively be stored in an index, tree, hashtable, or other data structure.

To identify the autocomplete suggestions 112a, 112b using the autocomplete data in the local cache 114, the computing device 103 can identify text segments that, for example, include the n-gram 104 or otherwise match the n-gram 104. For example, the computing device 103 can identify text that starts with or otherwise includes the sequence of characters in the n-gram 104 (e.g., text for which the n-gram 104 is a prefix or an infix). The computing device 103 may also identify text that matches a potential spelling-error correction of the n-gram 104. For example, if an n-gram includes the text "bst", the computing device 103 may identify the text "best" as a match.

Of the identified text segments that match the n-gram 104, the computing device 103 may select some or all as autocomplete suggestions 112a, 112b. For example, the computing device 103 may select words or phrases that the autocomplete data indicates have at least a pre-specified minimum frequency of occurrence, as the user 102 is more likely to enter these words and phrases than words or phrases that do not have at least the pre-specified minimum frequency of occurrence.

In state (C), the computing device 103 sends a request 124 to the server system 120 to request additional autocomplete suggestions for the n-gram 104. The request 124 includes the n-gram 104, thereby enabling the server system 120 to identify matching text in autocomplete data stored on one or more storage devices 125.

In some implementations, the computing device 103 transmits the request 124 for additional autocomplete suggestions irrespective of whether, for example, autocomplete suggestions are identified in the local cache 114 during state (B), and irrespective of whether the identified autocomplete suggestions 112a, 112b are determined be of high quality (e.g., determined to have a use frequency or use count that satisfies a threshold.) For example, the server system 120 may be able to provide autocomplete suggestions that are different from those identified using the local cache 114 of the computing device 103, thereby enhancing the usefulness of suggestions that the computing device 103 provides to the user 102.

The server system 120 may be able to provide different autocomplete suggestions than those identified in the local cache, for example, because the server system may have access to larger stores of autocomplete data than can be stored on the local cache 114. In some instances, this access to larger stores of autocomplete data may enable the server system 120 to provide a set of autocomplete suggestions that is more comprehensive than the autocomplete suggestions 112a, 112b. In addition, the autocomplete data for the server system 120 may be updated more frequently than the autocomplete data in the local cache 114, and thus may better reflect current word usage and emerging word usage trends.

As usage patterns of words and phrases change over time, the server system 120 can identify the changes and can update the autocomplete data stored on the one or more storage devices 125. As a result, the server system 120 can provide autocomplete suggestions based on recent usage (e.g., based on usage during a recent period of hours or days).

For example, soon after a newsworthy event occurs, names of people or places associated with the event may be used frequently in search queries. Text that may have been entered infrequently (e.g., less than a threshold rate over time) by users before the event may be entered frequently (e.g., more than the threshold rate over time) after the event, and thus may become more appropriate as an autocomplete suggestion. The server system 120 can (i) access search query logs that indicate recent queries, (ii) determine that the popularity or frequency of particular words and phrases have increased, and (iii) alter the stored autocomplete data to indicate the increased likelihood that users will enter those words and phrases. Autocomplete suggestions provided by the server system 120 may thus reflect the increased popularity of those words or phrases. By contrast, the autocomplete suggestions identified using the local cache 114, which may not be updated as frequently, may not yet reflect such changes in usage patterns.

In some implementations, the server system 120 tracks data entered on multiple devices associated with the user 102. For example, assume that a user has opted-in or otherwise requested that their auto-complete suggestions be based on the data that the user enters while logged into a user account. In this example, the server system 120 can store information indicating a history of text entry that occurred while the user 102 was logged in to the user account, irrespective of whether the text is entered on the computing device 103 or another device. In this example, the server system 120 can generate autocomplete suggestions based on text entry from a larger set of information than may be available to the computing device 103.

In addition, the server system 120 may identify autocomplete suggestions based on input entered by many different anonymous users. For example, the server system 120 may have access to logs of queries entered by multiple anonymous users or have access to other user-generated content. The server system 120 can have access to browsing histories for different anonymous users, and thus may retrieve text accessed by different anonymous users. The server system 120 can extract words and phrases from these information sources, and can determine the relative frequency with which the extracted words and phrases occur in the information sources. The server system 120 can then provide autocomplete suggestions based on this data in response to requests received. For example, the server system 120 can select, as autocomplete suggestions for received n-grams, words and phrases that occur with the highest frequencies in the search queries or viewed content of the anonymous users.

The request 124 may indicate a type of control 106 in which the n-gram 104 is received. When the control 106 is control for receiving a search query, for example, the request 124 can indicate that that control 106 is a search control or that the n-gram 104 represents a portion of a search query. When the server system 120 receives a request 124 that indicates that the n-gram 104 is a search query, for example, the server system 120 can provide search queries submitted by the user 102 or by other users as autocomplete suggestions, and may select from among various autocomplete suggestions based on use frequencies determined from search query history data.

In some implementations, to reduce delays in receiving autocomplete suggestions from the server system 120, the computing device 103 can send the request 124 before (or concurrently with) performing operations to identify the autocomplete suggestions 112a, 112b in the local cache 114.

The local cache 114 of autocomplete data may be stored in, for example, one or more storage devices included in the computing device 103. Because the local cache 114 can be stored in the computing device 103, the latency to access the local cache 114 and to identify the autocomplete suggestions 112a, 112b can be lower than the latency associated with obtaining autocomplete suggestions over a network. Thus, the autocomplete suggestions 112a, 112b can generally be obtained from the local cache 114 faster than autocomplete suggestions that are obtained from the server system 120.

As noted above, the autocomplete suggestions 112a, 112b from the local cache 114 can be identified before additional autocomplete suggestions are received from the server system 120. However, the autocomplete suggestions 112a, 112b may not be as comprehensive or as up to date as autocomplete suggestions from the server system 120, such that the quality of the autocomplete suggestions may be improved by presenting the additional autocomplete suggestions that are received from the server system 120. Thus, the computing device 103 can be configured to prevent display of the autocomplete suggestions 112a, 112b for a time, during which additional autocomplete suggestions may be received.

If the additional autocomplete suggestions are received within the specified timeout interval, the additional autocomplete suggestions may be displayed with (or instead of) the autocomplete suggestions 112a, 112b in a single update to the user interface 108a. The computing device 103 thus avoids the need for later updates autocomplete suggestions displayed on the user interface 108a, which may be disconcerting to the user 102. In some instances, frequent display updates may increase the likelihood that a user interface changes while a user attempts to make a selection, potentially resulting in an erroneous selection.

In some implementations, the computing device 103 can defer presentation of the autocomplete suggestions 112a, 112b until a presentation event occurs (i.e., an event that must occur prior to presentation of autocomplete suggestions). As described in more detail below, the presentation event can be the passing of a predetermined amount of time or receipt of additional autocomplete suggestions from the server system 120.

In state (D), the computing device 103 begins to measure a predetermined timeout interval after requesting additional autocomplete suggestions (or alternatively after receiving the one or more characters). For example, the computing device 103 can identify a first time at which the additional autocomplete suggestions were requested, for example, by accessing the value of a system clock when the request is sent. The first time can mark the beginning of a predetermined timeout interval for the request 124. The first time can substantially correspond to, for example, the time of the transmission of the request 124, while a second time can be specified as the end of the timeout interval. The predetermined timeout interval is represented in FIG. 1 as a timer 126. The computing device 103 can optionally measure the passage of time for the timeout interval using a timing subroutine or function, or using a timer object that produces a notification to indicate the end of the timeout interval.

The computing device 103 uses the timeout interval to combine benefits of the autocomplete suggestions 112a, 112b from the local cache 114 and additional autocomplete suggestions from the server system 120. If a response to the request 124 is not received before the end of the timeout interval, the computing device 103 provides the autocomplete suggestions 112a, 112b to the user 102. For example, the computing device 103 provides the autocomplete suggestions in response to determining, for example, that the timeout interval has ended before a response is received. The timeout interval can thus represent a maximum delay that the user 102 must wait before autocomplete suggestions are provided for the n-gram 104.

If the computing device 103 receives a response from the server system 120 before the timeout interval ends, the computing device 103 can provide autocomplete suggestions selected from received autocomplete suggestions and the autocomplete suggestions 112a, 112b. The computing device 103 can select the autocomplete suggestions 112a, 112b that have the highest likelihood of matching text that the user is attempting to enter. The computing device 103 can thus merge the received autocomplete suggestions with the autocomplete suggestions 112a, 112b to form a single set of autocomplete suggestions. The computing device 103 can then provide autocomplete suggestions in, for example, a single update to the user interface 108a. The update can be provided such that the user does not perceive multiple refreshes or changes to the user interface 108a.

In this manner, the computing device 103 prevents display of the autocomplete suggestions 112a, 112b until the earlier of (i) a time corresponding to the end of the timeout interval and (ii) a time at which additional autocomplete suggestions are received from the server system 120. The computing device 103 thus balances the tradeoff between providing autocomplete suggestions quickly (e.g., the autocomplete suggestions 112a, 112b from the local cache 114) and providing more comprehensive or more current autocomplete suggestions (e.g., additional autocomplete suggestions from the server system 120).

In some implementations, the timeout interval is a pre-specified amount of time. For example, the timeout interval can be specified as 400 milliseconds (ms), such that autocomplete suggestions will be presented at the user device 400 ms seconds after the request for additional autocomplete suggestions, irrespective of whether the additional autocomplete suggestions have been received from the server system 120. In this example, the second time that indicates the end of the timeout interval can be specified as 400 ms after the request for the additional autocomplete suggestions (i.e., 400 ms after the first time).

In some implementations, the timeout interval is dynamically determined, by the computing device 103. The computing device 103 can determine the timeout interval at the time the request 124 is sent to the server system 120 or before. The computing device 103 can set the length of the timeout interval based on various factors. The timeout interval used by the computing device 103 can thus vary depending on the environment and surroundings of the computing device 103 and other factors.

The computing device 103 can select the length of the timeout interval from within a range of, for example, 100 ms to 500 ms. The length of the timeout interval can thus have a duration that is less than other typical network requests, which may have timeout intervals of multiple seconds. The timeout interval may be set based on a likelihood that a response will be received within the timeout interval. For example, the duration can be set such that the likelihood of receiving a response is greater than a threshold (e.g., seventy percent). The timeout interval can also be set such that the response time provides a natural, positive experience for the user 102, as an excessive delay before providing autocomplete suggestions may limit the usefulness of the autocomplete suggestions.

The computing device 103 can determine an appropriate length for the timeout interval based on, for example, a network context of the computing device 103. The network context can include, for example, a network connection speed or a type of network connection through which the computing device 103 communicates with the server system 120. For example, the timeout interval may be shorter if the computing device 103 is using a Wireless Fidelity (WiFi) connection than if the computing device 103 is using a cellular 3G (third generation) connection. If the timeout interval is determined by an application running in a web browser, network information may be obtained from, for example, the value of a "navigator.connection" JavaScript property.

As another example, the timeout interval may be determined based on a typing speed, for example, a typing speed of the user 102. In general, longer timeout intervals may be used for users with slower typing speeds. The timeout interval may be based on, for example, a recent typing speed of the user 102, for example a typing speed during a current task or session of use. Other methods of calculating a timeout interval based on a typing speed can also be used. In addition, or as an alternative, the timeout interval may be based on an average historical typing speed, for example, an average text entry speed of the user 102 for the active application or an average text entry speed across multiple applications. The typing speeds can be speeds measured for input to the computing device 103 or for other devices associated with the user 102.

In some implementations, the computing device 103 determines the timeout interval based on a typing speed determined for a class of users, for example, a class of users who speak a particular language, all users who use an application or web page, or all users for which the server system 120 (or another server) has typing speed information.

The timeout interval may also be determined based on the device type of the computing device 103. Different types of devices can have different timeout values or ranges of timeout values. For example, an application running on a device that does not have a keyboard may set a longer timeout range than an application running on a device that does have a keyboard.

In state (E), the computing device 103 determines that a presentation event has occurred, such that the autocomplete suggestions 128 can be provided to the user. The presentation event can be, for example, the end of the timeout interval or the receipt of additional autocomplete suggestions from the server system 120.

The computing device 103 provides the autocomplete suggestions 128, for example, on the user interface 108b, as an update to the user interface 108a. The computing device 103 can provide the autocomplete suggestions 112a, 112b by displaying the autocomplete suggestions 112a, 112b on a display of the computing device 103 or by providing data to another system. The autocomplete suggestions 112a, 112b may be received by and displayed on another device, for example, a display or another computing device separate from, and in communication with, the computing device 103.

In the illustrated example, the computing device 103 determines that the timeout interval ends before additional autocomplete suggestions are received over the network 122. In response, the computing device 103 provides the autocomplete suggestions 112a, 112b, which were identified in the local cache 114. In this instance, the length of time that the user 102 waits for autocomplete suggestions to be presented is limited to the length of the predetermined timeout interval.

The computing device 103 can determine that the timeout interval has ended by, for example, determining that a value of a system clock equals or exceeds a value corresponding to the end of the timeout interval. As an alternative, an operating system, a web browser or other application, a script, or a timer object may provide a notification that the end of the timeout interval has been reached. The notification can be provided through a return value of a function, an asynchronous message or event, or other functionality.

In state (F), the server system 120 provides a response 132 to the request 124. The response 132 includes additional autocomplete suggestions 134a, 134b for the n-gram 104. In the illustrated example, the response 132 is received by the computing device 103 after the end of the timeout interval, and the autocomplete suggestions 134a, 134b include "American" and "ask".

In some implementations, the server system 120 can identify the additional autocomplete suggestions 134a, 134b based on the n-gram 104 and one or more of, for example, an identifier for the user 102, the type of control 106 or application in which the n-gram 104 was entered, and a device type of the computing device 103.

In state (G), the computing device 103 optionally provides updated autocomplete suggestions 136. The updated autocomplete suggestions 136 can be displayed on the user interface 108c of the computing device 103, as an update to the user interface 108b. The updated autocomplete suggestions 136 may include a combination of one or more of the autocomplete suggestions 112a, 112b and one or more of the autocomplete suggestions 134a, 134b. For example, the autocomplete suggestions 136 can be a merged set of autocomplete suggestions selected from those identified from the local cache 114 and those received from the server system 120.

When the cached autocomplete suggestions 112a, 112b are currently displayed on the user interface 108b, the computing device 103 does not necessarily change the user interface 108b when additional autocomplete suggestions 134a, 134b are received. The computing device 103 analyzes the received autocomplete suggestions 134a, 134b and the cached autocomplete suggestions 112a, 112b. Based on the analysis, the computing device 103 determines whether to provide updated autocomplete suggestions 136 or to maintain the already displayed autocomplete suggestions 112a, 112b without changing the user interface 108b.

As described above, a delay may occur between the transmission of the request 124 and the receipt of additional autocomplete suggestions. In some instances, the delay in may be long enough that, by the time a response from the server system 120 reaches the computing device 103, the user 102 has entered additional characters or has otherwise altered the n-gram 104. As a result, some or all of the autocomplete suggestions transmitted by the server system 120 may no longer match the altered n-gram 104 and thus may be invalid when received.

Before providing the received autocomplete suggestions 134a, 134b, the computing device 103 determines whether the autocomplete suggestions 134a, 134b are relevant to the text currently in the control 106. If the user 102 has added to or otherwise changed the text in the control 106, some or all of the additional autocomplete suggestions 134a, 134b may be invalid. For example, if user 102 enters an additional character, "c", resulting in the character sequence "ac" being present the control 106, then the autocomplete suggestions 134a, 134b, "American" and "ask", would not be valid because they do not include the character sequence "ac".

The computing device 103 can access or generate a quality score for the each of the autocomplete suggestions 112a, 112b, 134a, 134b that are relevant to the text in the control 106. The quality score can indicate, for example, a likelihood that an autocomplete suggestion represents input the user is currently entering. For a particular autocomplete suggestion, the value of the quality score can be based on, for example, a frequency of use or use count for the particular autocomplete suggestion, based on usage by the user 102 or usage by multiple users. The computing device 103 can access usage frequency information for the autocomplete suggestions 112a, 112b from the local cache 114, and the server system 120 can transmit usage frequency information for the autocomplete suggestions 134a, 134b in the response 132.

The computing device 103 can select the autocomplete suggestions 136 to include the autocomplete suggestions that have the highest N quality scores. For example, the N autocomplete suggestions with the highest quality scores can be selected, where N is an integer, for example, three or five.

In some instances, the computing device 103 does not change the user interface 108b unless providing the updated set of autocomplete suggestions 136 increases the number or quality of autocomplete suggestions displayed by a minimum threshold level. Thus the computing device 103 can be biased to maintain a consistent user interface unless a change to the user interface provides at least a minimum level of increase in, for example, the number of autocomplete suggestions displayed, the average quality score of autocomplete suggestions displayed, or the quality score of the autocomplete suggestion with the highest quality score.

When the highest-quality autocomplete suggestions 136 provide a level of increase in number or quality over the displayed autocomplete suggestions 128 that satisfies a threshold, the computing device 103 can update the user interface 108b to display the autocomplete suggestions 136. By contrast, when the highest-quality autocomplete suggestions 136 do not provide the threshold level of improvement, the autocomplete suggestions 128 are maintained, avoiding unnecessary alteration of the user interface 108b while the user 102 may be reading or selecting.

The determination whether to update the user interface 108b can thus be based on one or more of, for example, the number and quality of the displayed autocomplete suggestions 112a, 112b and the number and quality of the received autocomplete suggestions 134a, 134b. For example, the computing device 103 may provide the updated autocomplete suggestions 136 if the received autocomplete suggestions 134a, 134b include a threshold number (e.g., three) of unique autocomplete suggestions that are not included in the already displayed autocomplete suggestions 128. If fewer than the threshold number of unique autocomplete suggestions are received, then updated autocomplete suggestions 136 may not be provided.

The autocomplete suggestions 112a, 112b, 134a, 134b can be assessed by comparing their respective quality scores to quality score thresholds that represent, for example, high quality and low quality levels. The number of currently displayed autocomplete suggestions 112a, 112b and the number of additional autocomplete suggestions 134a, 134b can also be compared to appropriate threshold values.

When a count of the currently-displayed autocomplete suggestions 128 exceeds a predetermined number, or when a quality score associated with the currently-displayed autocomplete suggestions 128 satisfies a threshold, an update to a display may not be needed. The currently-displayed autocomplete suggestions 128 are likely to be sufficient for the user 102, and thus the computing device 103 can determine that the user interface 108b should not be updated. By contrast, when a count of the autocomplete suggestions 128 does not exceed the predetermined number, or when a quality score associated with the autocomplete suggestions 128 does not satisfy a threshold, the user 102 may derive minimal benefit from the currently-displayed autocomplete suggestions 128, and thus the computing device 103 can determine that the user interface 108b should be updated.

In addition, or as an alternative, when a count of the additional autocomplete suggestions 134a, 134b exceeds a predetermined number, or when a quality score associated with the additional autocomplete suggestions 134a, 134b satisfies a threshold, the computing device 103 can determine that the user interface 108b should be updated to display the additional autocomplete suggestions 134a, 134b. By contrast, when the count of the additional autocomplete suggestions 134a, 134b does not exceed a predetermined number, or when the quality score associated with the additional autocomplete suggestions 134a, 134b does not satisfy a threshold, the incremental benefit of providing new autocomplete suggestions may not outweigh the disturbance to the user 102 by altering the user interface 108b, and the computing device 103 may determine that an update should not be performed.

The computing device 103 can also determine whether to update the user interface 108b based on, for example, (i) whether the difference between the number of autocomplete suggestions 136 and the number of autocomplete suggestions 128 satisfies a threshold, (ii) whether the difference between an average quality score for the autocomplete suggestions 136 and the average quality score for the autocomplete suggestions 128 satisfies a threshold, or (iii) whether the autocomplete suggestions 136 that are not included in the autocomplete suggestions 128 have quality scores that satisfy a threshold or have a total number that satisfies a threshold.

In some implementations, when the computing device 103 determines that the autocomplete suggestions 136 should be presented, the computing device 103 notifies the user 102 before changing the user interface 108b, for example, with an animation or other cue. For example, a visual indication can be provided to indicate that the displayed autocomplete suggestions 128 will be altered, before updating the display to indicate the received autocomplete suggestions. The additional autocomplete suggestions 134a, 134b may be inserted into a set of already displayed autocomplete suggestions 128, for example, by a fade-in animation or other gradual transition.

The computing device 103 may add the received autocomplete suggestions 134a, 134b to the display in a nonintrusive manner. For example, the additional autocomplete suggestions 134a, 134b can be added in a manner that other autocomplete suggestions need not be moved, for example, at the end of a list displayed on the user interface 108c. As an alternative, the autocomplete suggestions 136 can be ordered, for example, in alphabetical order or ranked according to their respective quality scores.

After providing the autocomplete suggestions 128, the computing device 103 may delay presenting the additional autocomplete suggestions 134a, 134b for a predetermined time period to avoid making rapid changes that may disorient the user 102. For example, the display may be updated at a predetermined time period, for example, one or two seconds, after the autocomplete suggestions 128 are initially displayed. The computing device 103 can update the user interface 108b to indicate the additional autocomplete suggestions 134a, 134b in response to, for example, determining that the predetermined time period has elapsed. As an alternative, the computing device 103 can update the user interface 108b in response to another presentation event that indicates that the update should occur.

In some implementations, rather than processing the response 132, the computing device 103 may ignore the response 132 whenever it is received after the end of the timeout interval. In some implementations, the computing device 103 determines whether or not to provide the received autocomplete suggestions 134a, 134b based on a time at which the autocomplete suggestions 134a, 134b are received. For example, if the autocomplete suggestions 134a, 134b are received within a predetermined time period (e.g., one second) after the autocomplete suggestions 128 are first displayed, then the valid autocomplete suggestions 134a, 134b may be merged with the autocomplete suggestions 112a, 112b and displayed. If the autocomplete suggestions 134a, 134b are received after the predetermined time period, however, the autocomplete suggestions 134a, 134b may not be provided.

In the illustrated example, the computing device 103 receives the response 132 from the server system 120 after the end of the timeout interval for the request 124. However, when the computing device 103 receives the response 132 before the end of the timeout interval, the computing device 103 can present the merged set of autocomplete suggestions 136 as the initial set of autocomplete suggestions for the n-gram 104. In such an instance, the computing device 103 can update the user interface 108a to include the autocomplete suggestions 136, as illustrated in the user interface 108c, and the intermediate user interface 108b of state (E) need not be displayed.

The operations described for states (A) to (G) can be repeated as the user 102 enters additional input. In states (A) to (G), the operations performed by the computing device 103 can be performed by one or more different components or programs of the computing device 103. For example, the operations can be performed by an operating system, a web browser or other application, a web page or other downloaded code, or a combination thereof. The various applications and components of the computing device 103 can interact to perform the various operations.

The computing device 103 can update the local cache 114 based on the received autocomplete suggestions 134a, 134b, regardless of whether any of the received autocomplete suggestions 134a, 134b are provided to the user 102. Updates to the local cache 114 can include, for example, addition of new words or phrases, altering usage statistics, and/or deleting words or phrases. In addition, the local cache 114 may be updated to reflect user inputs that the user commits by, for example, selecting an autocomplete suggestion, selecting an "enter" key, or selecting another control, such as a search control. In some implementations, the computing device 103 may send information about of user input, for example, recent additions to the local cache 114, to the server system 120, permitting the server system 120 to update the autocomplete data for the user 102 that is stored on the one or more storage devices 125.

In some implementations, the techniques described herein can be used to provide autocomplete suggestions before a user enters any characters into the control 106. For example, the computing device 103 can provide autocomplete suggestions for an n-gram that includes zero characters (e.g., a "zero input" state of the control 106). The computing device 103 can determine that autocomplete suggestions should be obtained when, for example, the computing device determines that the user 102 interacts with the control 106, for example, when the user 102 clicks on, selects, hovers over, focuses on, or otherwise interacts with the control 106.

In response to detecting user interaction with the control 106, the computing device 103 can identify autocomplete suggestions in the local cache 114 that are, for example, frequently entered (e.g., have a use frequency above a threshold level) or were recently entered (e.g., were entered more recently than a threshold time). The computing device 103 can send a request to the server system 120 for additional autocomplete suggestions, which the server system 120 can select based on frequency of use or time of use. The computing device 103 can then present autocomplete suggestions as described above, for example, by displaying received autocomplete suggestions if received before the end of a timeout interval, and displaying the cached autocomplete suggestions if the timeout interval ends before additional autocomplete suggestions are received.

Figure 2:
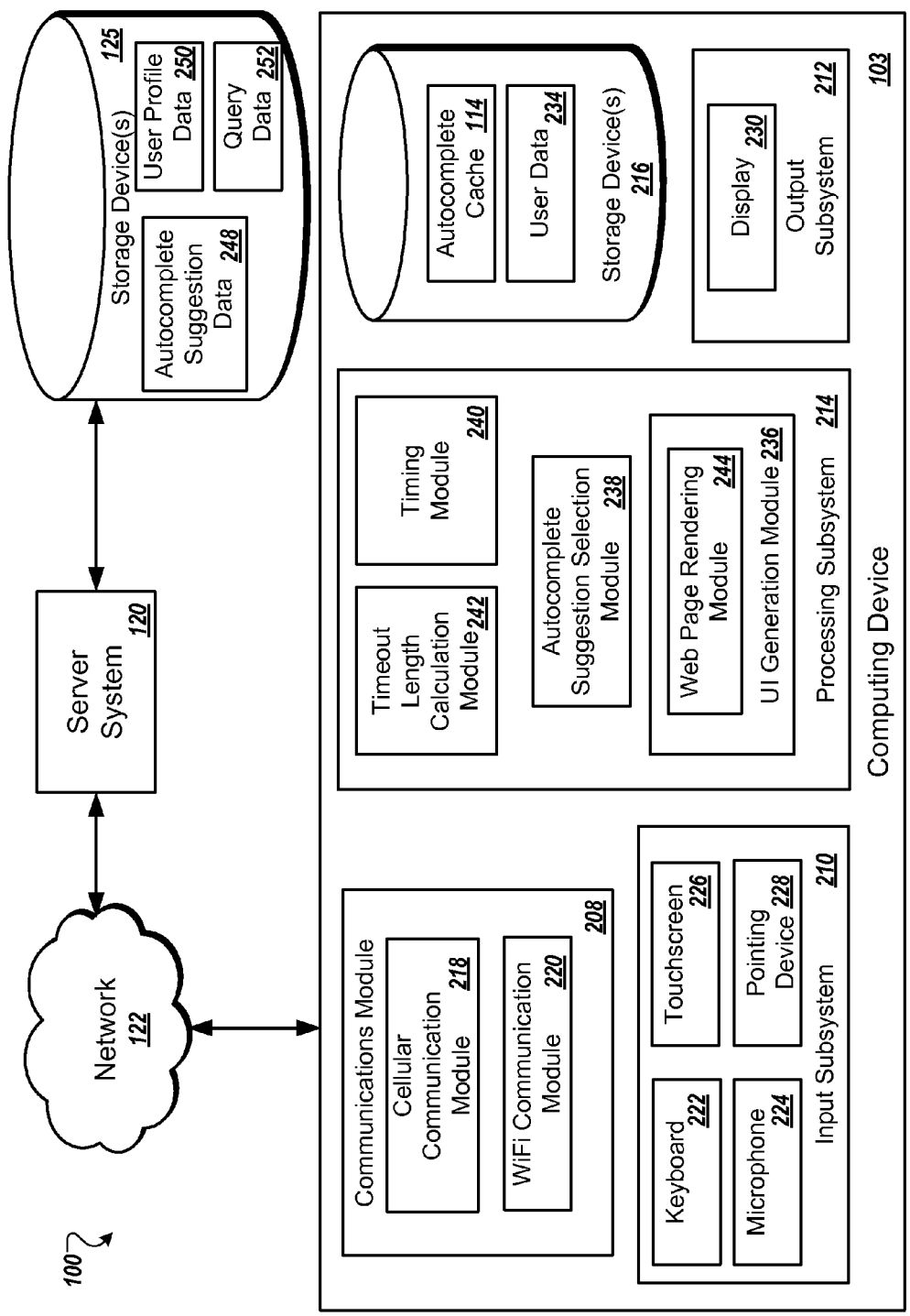
FIG. 2 is a block diagram of the environment in which additional components of the computing device are illustrated.

FIG. 2 is a block diagram of the environment 100 in which additional components of the computing device 103 are illustrated. The computing device 103 can optionally include one or more of the components illustrated.

The computing device 103 may include a communications module 208, an input subsystem 210, an output subsystem 212, a processing subsystem 214, and one or more storage devices 216. The communications module 208 includes a cellular communication module 218 and a WiFi communications module 220. The cellular communications module 218 enables the computing device 103 to communicate over cellular networks. For example, if the computing device 103 is a mobile device, the cellular communications module 218 may enable the computing device 103 to send and receive voice and/or text messages over one or more cellular networks. The WiFi communications module 220 enables the computing device 103 to communicate over wireless networks. The communications module 208 may include other modules for communicating over other types of networks.

The input subsystem 210 enables the computing device 103 to receive input. For example, text input may be received from a keyboard 222 and voice input may be received from a microphone 224. The user may also provide input using a touchscreen 226 or a pointing device 228. Autocomplete suggestions can be provided for text input, regardless of the input device used to enter the text. For example, voice input may be converted to the text input that is used to obtain autocomplete suggestions. Other types of input are possible, and autocomplete suggestions may, in some implementations, be identified and provided for input other than text input. The output subsystem 212 can include a display 230 on which the user interfaces 108a-108c can be provided. In some implementations, the output subsystem 212 may include other devices to provide output in the form of, for example, text, images, video, audio, and printed output.

The one or more storage devices 216 are capable of storing, for example, executable instructions and data. The one or more storage devices 216 may include, for example, a hard disk device, an optical disk device, a flash memory, a microdrive, or other similar solid state memory device, or an array of devices. The one or more storage devices 216 include the autocomplete cache 114 and user data 234. The autocomplete cache 114, described above with respect to FIG. 1, may include cached autocomplete suggestions that are received from and made accessible to one or more applications. The user data 234 may include information that identifies the user or provides other information about the user, for example, one or more user identifiers, demographic information for the user, one or more cookies, or other user-related information.

The processing subsystem 214 includes a user interface (UI) generation module 236, an autocomplete suggestion selection module 238, a timing module 240, and a timeout length calculation module 242. The UI generation module 236 is configured to generate a user interface that accepts user input. For example, the UI generation module 236 may generate the user interfaces 108a-108c of FIG. 1. The UI generation module 236 may include a web page rendering module 244, which may, for example, be used to render a web page, such as to render content based on HTML (HyperText Markup Language) and CSS (Cascading Style Sheets) code.

The autocomplete suggestion selection module 238 is configured to identify autocomplete suggestions for a user input. For example, the autocomplete suggestion selection module 238 may identify autocomplete suggestions from the autocomplete cache 114. The autocomplete suggestion selection module 238 may identify autocomplete suggestions that, for example, include an n-gram of characters entered by a user. The autocomplete suggestion selection module 238 may also generate or access a quality score for identified autocomplete suggestions, and can select the autocomplete suggestions that have the highest quality scores, or quality scores above a threshold.

The autocomplete suggestion selection module 238 may determine whether to replace the displayed autocomplete suggestions with the received autocomplete suggestions, to merge the received autocomplete suggestions with the displayed autocomplete suggestions, or to not display the received autocomplete suggestions, as described above. The autocomplete suggestion selection module 238 may select autocomplete suggestions from multiple sources, including, for example, from a local cache and from autocomplete suggestions received over the network 122.

The timing module 240 can identify a time corresponding to a network request, and can identify a second time that corresponds to the end of a timeout interval for the network request. The timing module 240 may optionally start a timer or configure a timeout property of a network request to permit identification of the second time. As another example, the timing module 240 may set a timeout interval property of a timer object that is configured to provide a notification after the timeout interval elapses.

The timeout length calculation module 242 is configured to calculate the length of a timeout interval to be used by the timing module 240. The timeout interval may be based on one or more of, for example, a typing speed of the user of the computing device 103 or other users, a network connection speed or network type (e.g., as communicated by the communications module 208), or the device type of the computing device 103.

The server system 120 can include (or can otherwise communicate with) the one or more storage devices 125. The one or more storage devices 125 can store, for example, autocomplete suggestion data 248, user profile data 250 for multiple users, and query data 252 indicating query histories or statistics. The server system 120 may derive the autocomplete suggestion data 248 from the query data 252. The server system 120 can periodically update the text segments and corresponding usage statistics in the autocomplete suggestion data 248.

In response to a request received from the computing device 103 for autocomplete suggestions for a particular n-gram of characters, the autocomplete server system 120 may identify autocomplete suggestions for the n-gram from the autocomplete suggestion data 248 and may send the identified autocomplete suggestions to the computing device 103.

The identification of the autocomplete suggestions may be based on an anonymous user identifier for the user. For example, the autocomplete server system 120 may match a user identifier included in the request to a user identifier stored in the user profile data 250. The server system 120 may identify autocomplete suggestions based on the identified user profile data 250 associated with the user identifier, for example, by using personalized word usage statistics associated with (e.g., stored with reference to, and/or indexed according to) the user identifier.

Figure 3:
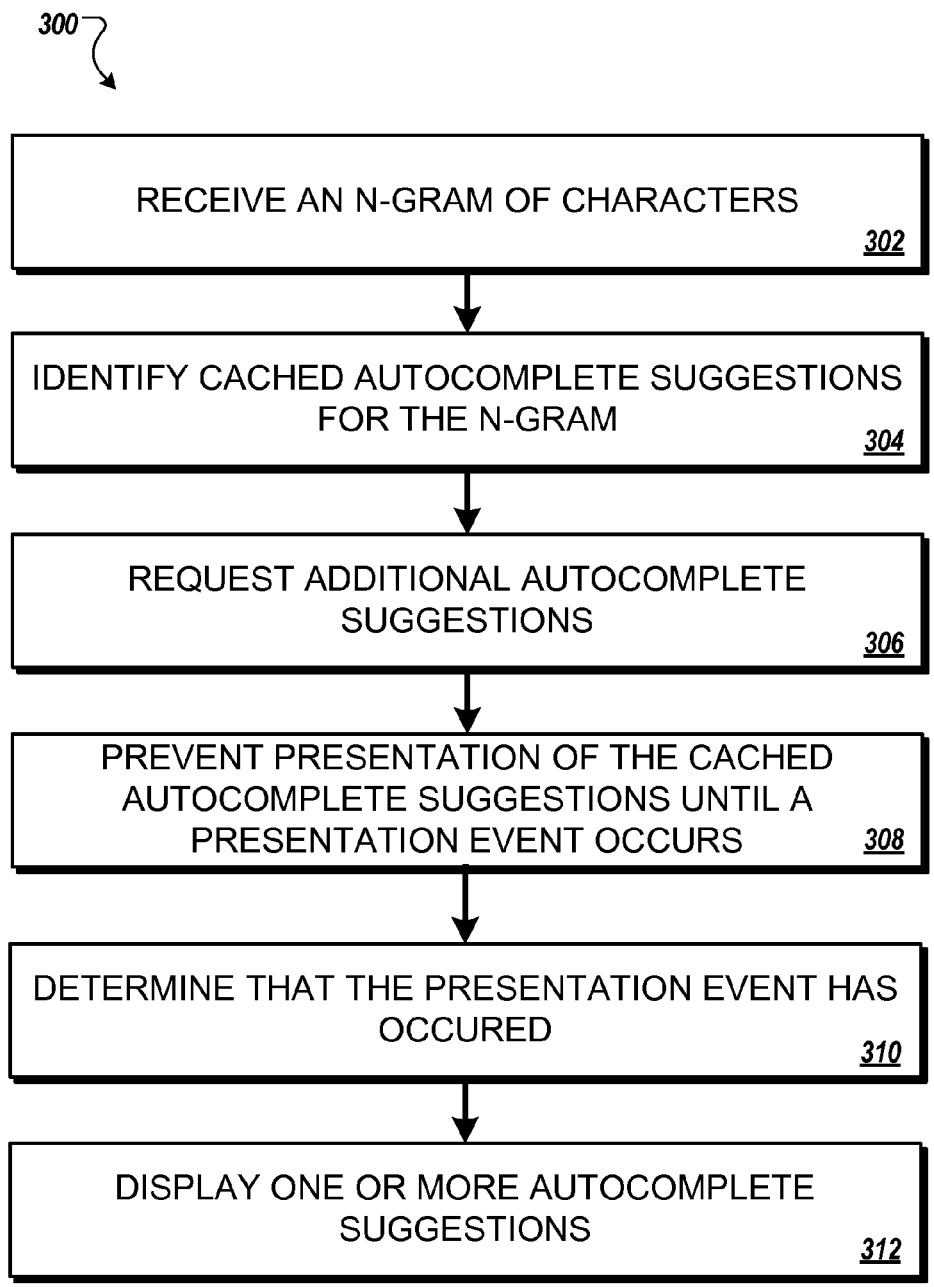
FIG. 3 is a flow diagram that illustrates an example of a process for providing autocomplete suggestions.

FIG. 3 is a flow diagram that illustrates an example of a process 300 for providing autocomplete suggestions. The process 300 may be performed, for example, by the computing device 103.

An n-gram of characters is received by a computing device (302). The n-gram may include, for example, one or more characters and one or more words. The n-gram may be received using a user interface control, such as a text field or text input area. The user interface control may be included in, for example, a user interface for an application, such as a search application, e-mail application, media application, text-messaging application, or another type of application.

Cached autocomplete suggestions for the n-gram are identified in a local cache of the computing device (304). For example, cached autocomplete suggestions that start with or that otherwise include the n-gram may be identified. As another example, it may be determined that the n-gram includes a spelling error, and cached autocomplete suggestions that match a spelling-error correction of the n-gram may be identified. In some implementations, the M-best autocomplete suggestions are identified, for example, by identifying M autocomplete suggestions in the local cache that have highest quality scores, where M is an integer. The quality score may be based on, for example, a frequency of use by the user of the computing device and/or by other users.

Additional autocomplete suggestions for the n-gram are requested, at a first time, over a network (306). For example, the computing device may send a request for autocomplete suggestions to an autocomplete server. The request may include, for example, the n-gram, user information, and information about the computing device.

Presentation of autocomplete suggestions is prevented, by the computing device, until a presentation event occurs (308). The presentation event can include (i) receiving the requested additional autocomplete suggestions by the computing device or (ii) the end of a predetermined period (e.g., the timeout interval described with respect to FIG. 1) after the first time.

In some implementations, the presentation event can be the earlier of (i) receiving the requested additional autocomplete suggestions by the computing device and (ii) the end of a predetermined period after the first time. Thus presentation of the cached autocomplete suggestions can be prevented until a second time is reached. For example, presentation of the autocomplete suggestions can be deferred or suspended until the second time. The second time can be an earlier of (i) a time at which the requested additional autocomplete suggestions are received by the computing device and (ii) an end of a predetermined period after the first time. For example, to identify the second time, upon requesting the additional autocomplete suggestions, a timer may be configured with a timer interval set to be the length of the predetermined period (e.g., 100 ms, 300 ms, 500 ms). As another example, a timeout property associated with the request may be set to the length of the predetermined period.

It is determined that the presentation event has occurred (310). For example, the computing device may be notified (e.g., by a timer object or by a timeout of the request) that the end of the predetermined period has been reached. As another example, the computing device may receive the requested additional autocomplete suggestions before the end of the predetermined period has been reached. Thus the occurrence of the presentation event can correspond to the second time, as described above.

In response to determining that the presentation event has occurred, one or more autocomplete suggestions are displayed (312). For example, when determining that the presentation event has occurred includes determining that the predetermined period after the first time, one or more of the cached autocomplete suggestions can be presented. As another example, when determining that the presentation event has occurred includes determining that the requested additional autocomplete suggestions have been received by the computing device, one or more of the received additional autocomplete suggestions may be presented. One or more of the cached autocomplete suggestions may also be presented in response to determining that the requested additional autocomplete suggestions have been received by the computing device.

The process 300 can include receiving additional autocomplete suggestions over the network after the predetermined period has elapsed. A display can be updated to indicate the received autocomplete suggestions. The display can be updated to display the additional autocomplete suggestions and the cached autocomplete suggestions. For example, updating the display may include merging one or more of the additional autocomplete suggestions with the cached autocomplete suggestions, or replacing one or more of the cached autocomplete suggestions with the additional autocomplete suggestions. Before updating the display to indicate the received autocomplete suggestions, it can be indicated that the display will be altered. For example, a visual indication can be provided to indicate that the displayed autocomplete suggestions will be changed.

The process 300 can include receiving additional autocomplete suggestions and determining whether the received additional autocomplete suggestions should be presented. The process 300 can include presenting the received additional autocomplete suggestions in response to determining that they should be presented, and not presenting the received additional autocomplete suggestions in response to determining that they should not be presented. The received additional autocomplete suggestions can be presented, for example, by updating a user interface to display the received additional autocomplete suggestions or by otherwise indicating the received additional autocomplete suggestions.

The process 300 can include determining whether the received additional autocomplete suggestions should be presented based on a number of additional autocomplete suggestions received or based on a quality score associated with one or more of the received autocomplete suggestions. For example, the received additional autocomplete suggestions can be presented in response to (i) determining that the number of additional autocomplete suggestions received exceeds a predetermined number or (ii) determining that a quality score associated with one or more of the received additional autocomplete suggestions satisfies the quality score threshold. In response to determining that the number of additional autocomplete suggestions received does not exceed the predetermined number or determining that a quality score associated with one or more of the received additional autocomplete suggestions does not satisfy the quality score threshold, a display of the cached autocomplete suggestions can be maintained such that the received additional autocomplete suggestions are not presented.

The process 300 can include determining whether the received additional autocomplete suggestions should be presented based on a number of cached additional autocomplete suggestions identified in the local cache or based on a quality score associated with one or more of the cached autocomplete suggestions. For example, the received additional autocomplete suggestions can be presented in response to (i) determining that the number of cached autocomplete suggestions identified in the local cache exceeds a predetermined number or (ii) determining that the quality score associated with one or more of the cached autocomplete suggestions satisfies the quality score threshold. In response to determining that the number of cached autocomplete suggestions identified in the local cache does not exceed the predetermined number or determining that the quality score associated with one or more of the cached autocomplete suggestions does not satisfy the quality score threshold, a display of the cached autocomplete suggestions can be maintained such that the received additional autocomplete suggestions are not presented.

In some implementations, it can be determined that a second presentation event has occurred, where the second presentation event corresponds to the end of a predetermined time period after providing the cached autocomplete suggestions. The display can be updated to indicate the received additional autocomplete suggestions in response to determining that the second presentation event has occurred.

The additional autocomplete suggestions may be based on data associated with a user account of a user of the computing device. For example, the additional autocomplete suggestions that are received can be selected based on a usage frequency of text that is input to any of multiple devices associated with a user account for a user of the computing device. The local cache of the computing device may be updated based on the received additional autocomplete suggestions, increasing the likelihood that a subsequent user input may be matched to a cached autocomplete suggestion.

The process 300 can include calculating the length of the predetermined period based on various factors, for example, a typing speed of a user of the computing device. The process 300 can include identifying a network connection type of the computing device and calculating the length of the predetermined period based on the identified network connection type.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
    downloading, to a computing device, code that, when executed by the computing device, causes the computing device to perform operations comprising:
        receiving, by the computing device, a user input;
        identifying, by the computing device, a set of cached autocomplete suggestions for the user input;
        requesting, by the computing device, a set of additional autocomplete suggestions for the user input over a network;
        after identifying the set of cached autocomplete suggestions, delaying, by the computing device, presentation of the set of cached autocomplete suggestions until an end of a timeout period;
        determining, by the computing device, that the set of additional autocomplete suggestions has not been received by the end of the timeout period; and
        in response to determining that the set of additional autocomplete suggestions has not been received by the end of the timeout period, presenting, by the computing device, at least a portion of the set of cached autocomplete suggestions.

2. The method of claim 1, wherein the operations further comprise:
    receiving the additional autocomplete suggestions over the network after the end of the timeout period; and
    updating a user interface to display the received additional autocomplete suggestions.

3. The method of claim 1, wherein the operations further comprise:
    receiving the additional autocomplete suggestions;
    determining that the received additional autocomplete suggestions should be presented based on a number of additional autocomplete suggestions received or based on a quality score associated with one or more of the received autocomplete suggestions; and
    presenting the additional autocomplete suggestions in response to determining that the additional autocomplete suggestions should be presented.

4. The method of claim 1, wherein the operations further comprise:
    receiving the additional autocomplete suggestions;
    determining that the received additional autocomplete suggestions should be presented based on a number of cached additional autocomplete suggestions identified in a local cache or based on a quality score associated with one or more of the cached autocomplete suggestions; and
    presenting the received additional autocomplete suggestions in response to determining that the received additional autocomplete suggestions should be presented.

5. The method of claim 1, wherein the operations further comprise:
    receiving the additional autocomplete suggestions; and
    updating a local cache of the computing device based on the received additional autocomplete suggestions.

6. The method of claim 1, wherein the operations further comprise receiving the additional autocomplete suggestions, the additional autocomplete suggestions that are received being selected based on input entered at a device that is associated with a user of the computing device and is different from the computing device.

7. The method of claim 1, wherein the operations further comprise:
    receiving, by the computing device, a second user input;
    identifying a second set of cached autocomplete suggestions for the second user input;
    requesting a second set of additional autocomplete suggestions for the second user input over a network;
    after identifying the second set of cached autocomplete suggestions, delaying presentation of the second set of cached autocomplete suggestions such that the second set of cached autocomplete suggestions are not presented during at least an initial portion of a second timeout period;
    receiving the second set of additional autocomplete suggestions during the second timeout period; and
    in response to receiving the second set of additional autocomplete suggestions during the second timeout period, presenting a combined set of autocomplete suggestions before the end of the second timeout period, the combined set of autocomplete suggestions including at least one autocomplete suggestion from the second set of cached autocomplete suggestions and at least one autocomplete suggestion from the second set of additional autocomplete suggestions.

8. A system comprising:
    a computing device and one or more storage devices storing instructions that are operable, when executed by the computing device, to cause the computing device to perform operations comprising:
        downloading, to the computing device, code that, when executed by the computing device, causes the computing device to perform second operations comprising:
            receiving, by the computing device, a user input;
            identifying, by the computing device, a set of cached autocomplete suggestions for the user input;
            requesting, by the computing device, a set of additional autocomplete suggestions for the user input over a network;
            after identifying the set of cached autocomplete suggestions, delaying, by the one or more computers, presentation of the set of cached autocomplete suggestions until an end of a timeout period;

determining, by the computing device, that the set of additional autocomplete suggestions has not been received by the end of the timeout period; and in response to determining that the set of additional autocomplete suggestions has not been received by the end of the timeout period, presenting, by the computing device, at least a portion of the set of cached autocomplete suggestions.

9. The system of claim 8, wherein the second operations further comprise:

receiving the additional autocomplete suggestions over the network after the end of the timeout period; and updating a user interface to display the received additional autocomplete suggestions.

10. The system of claim 8, wherein the second operations further comprise:

receiving the additional autocomplete suggestions;

determining that the received additional autocomplete suggestions should be presented based on a number of additional autocomplete suggestions received or based on a quality score associated with one or more of the received autocomplete suggestions; and presenting the additional autocomplete suggestions in response to determining that the additional autocomplete suggestions should be presented.

11. The system of claim 8, wherein the second operations further comprise:

receiving the additional autocomplete suggestions;

determining that the received additional autocomplete suggestions should be presented based on a number of cached additional autocomplete suggestions identified in a local cache or based on a quality score associated with one or more of the cached autocomplete suggestions; and presenting the received additional autocomplete suggestions in response to determining that the received additional autocomplete suggestions should be presented.

12. The system of claim 8, wherein the second operations further comprise:

receiving the additional autocomplete suggestions; and updating a local cache of the computing device based on the received additional autocomplete suggestions.

13. The system of claim 8, wherein the second operations further comprise receiving the additional autocomplete suggestions, the additional autocomplete suggestions that are received being selected based on input entered at a device that is associated with a user of the computing device and is different from the computing device.

14. The system of claim 8, wherein the second operations further comprise:

receiving, by the computing device, a second user input;

identifying a second set of cached autocomplete suggestions for the second user input;

requesting a second set of additional autocomplete suggestions for the second user input over a network;

after identifying the second set of cached autocomplete suggestions, delaying presentation of the second set of cached autocomplete suggestions such that the second set of cached autocomplete suggestions are not presented during at least an initial portion of a second timeout period;

receiving the second set of additional autocomplete suggestions during the second timeout period; and in response to receiving the second set of additional autocomplete suggestions during the second timeout period, presenting a combined set of autocomplete suggestions before the end of the second timeout period, the combined set of autocomplete suggestions including at least one autocomplete suggestion from the second set of cached autocomplete suggestions and at least one autocomplete suggestion from the second set of additional autocomplete suggestions.

15. A non-transitory computer-readable storage device storing a computer program, the program comprising instructions that when executed by a computing device cause the computing device to perform operations comprising:

downloading, to the computing device, code that, when executed by the computing device, causes the computing device to perform second operations comprising:

receiving, by the computing device, a user input;

identifying, by the computing device, a set of cached autocomplete suggestions for the user input;

requesting, by the computing device, a set of additional autocomplete suggestions for the user input over a network;

after identifying the set of cached autocomplete suggestions, delaying, by the computing device, presentation of the set of cached autocomplete suggestions until an end of a timeout period;

determining, by the computing device, that the set of additional autocomplete suggestions has not been received by the end of the timeout period; and in response to determining that the set of additional autocomplete suggestions has not been received by the end of the timeout period, presenting, by the computing device, at least a portion of the set of cached autocomplete suggestions.

16. The non-transitory computer-readable storage device of claim 15, wherein the second operations further comprise:

receiving the additional autocomplete suggestions over the network after the end of the timeout period; and updating a user interface to display the received additional autocomplete suggestions.

17. The non-transitory computer-readable storage device of claim 15, wherein the second operations further comprise:

receiving the additional autocomplete suggestions;

determining that the received additional autocomplete suggestions should be presented based on a number of additional autocomplete suggestions received or based on a quality score associated with one or more of the received autocomplete suggestions; and presenting the additional autocomplete suggestions in response to determining that the additional autocomplete suggestions should be presented.

18. The non-transitory computer-readable storage device of claim 15, wherein the second operations further comprise:

receiving the additional autocomplete suggestions;

determining that the received additional autocomplete suggestions should be presented based on a number of cached additional autocomplete suggestions identified in a local cache or based on a quality score associated with one or more of the cached autocomplete suggestions; and presenting the received additional autocomplete suggestions in response to determining that the received additional autocomplete suggestions should be presented.

19. The non-transitory computer-readable storage device of claim 15, wherein the second operations further comprise:

receiving the additional autocomplete suggestions; and updating a local cache of the computing device based on the received additional autocomplete suggestions.

20. The non-transitory computer-readable storage device of claim 15, wherein the second operations further comprise receiving the additional autocomplete suggestions, the additional autocomplete suggestions that are received being selected based on input entered at a device that is associated with a user of the computing device and is different from the computing device.

* * * * *